J. MICHITSCH.
CANDY MACHINE.
APPLICATION FILED JULY 19, 1913.

1,108,461.

Patented Aug. 25, 1914.
7 SHEETS—SHEET 1.

WITNESSES:
R. E. Slaven
C. M. Fitzgibbon

INVENTOR
John Michitsch,
BY
Chas. F. Schmelz
ATTORNEY

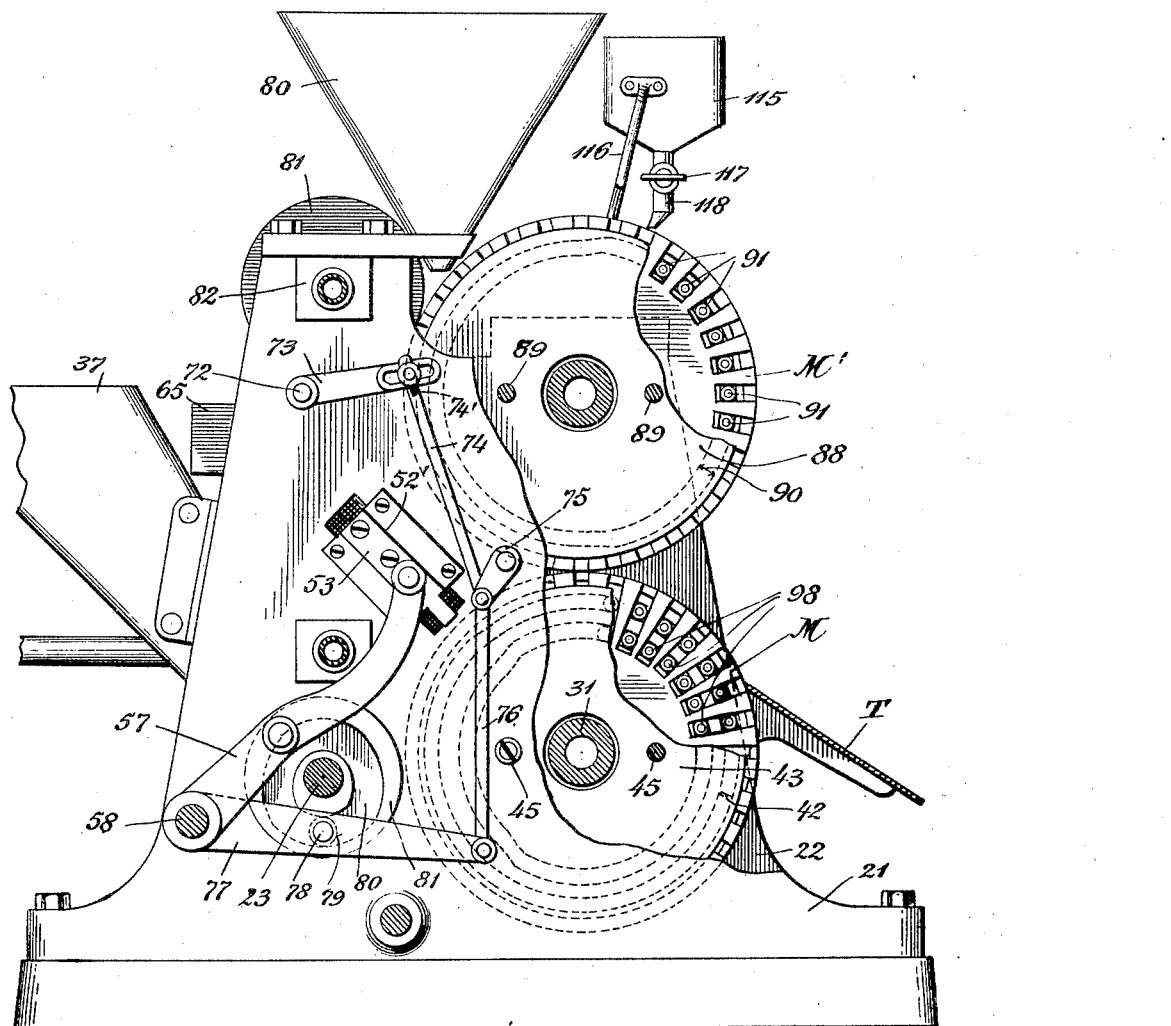

J. MICHITSCH.
CANDY MACHINE.
APPLICATION FILED JULY 19, 1913.

1,108,461.

Patented Aug. 25, 1914.

7 SHEETS—SHEET 3.

WITNESSES:
E. M. Fitzgibbon
R. E. Slaven

INVENTOR
John Michitsch,
BY Chas. F. Schmelz
ATTORNEY

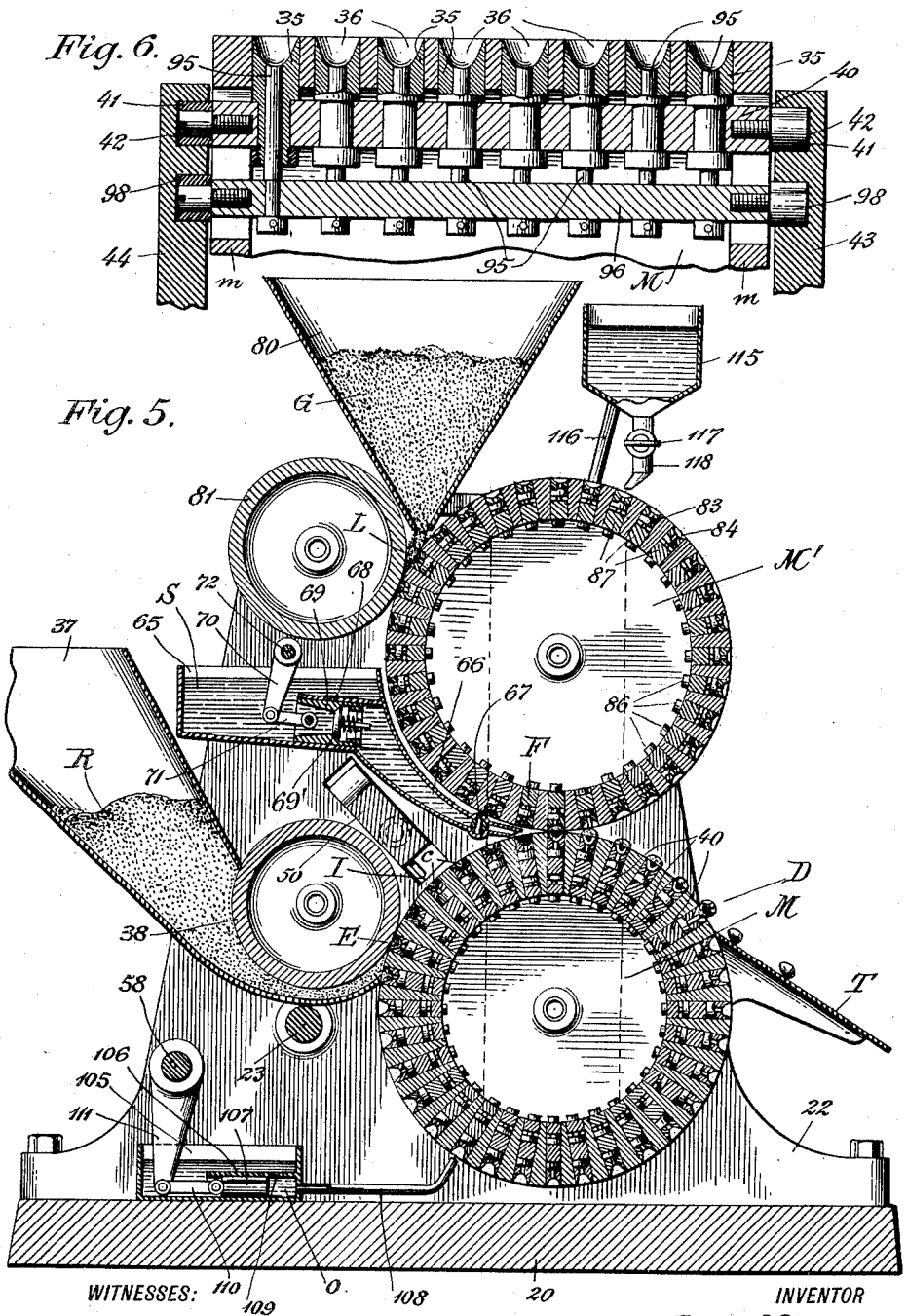

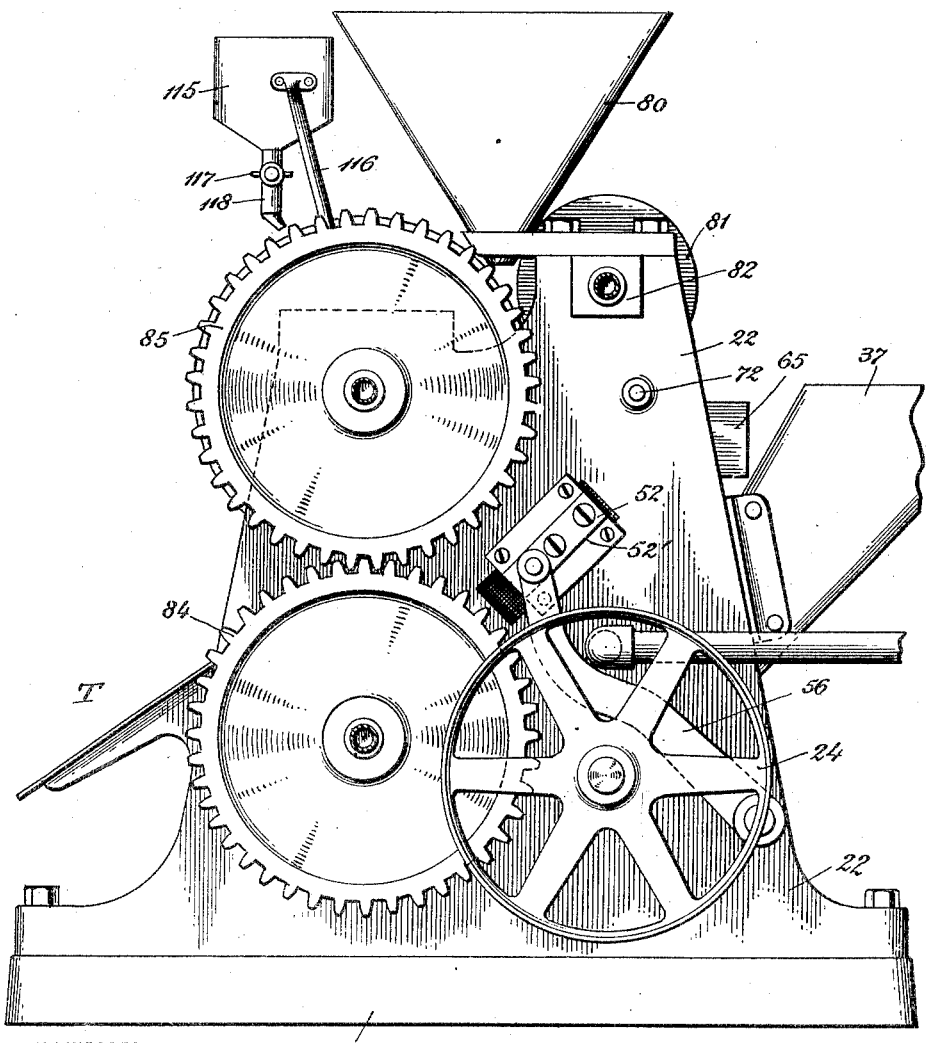

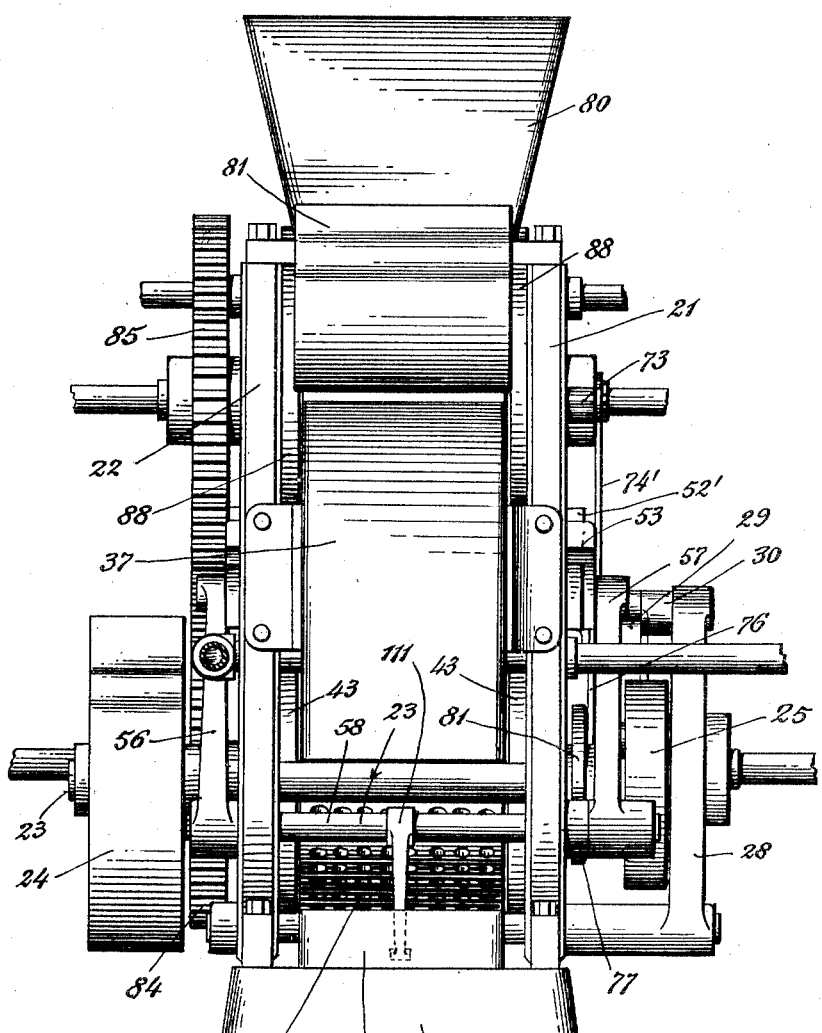

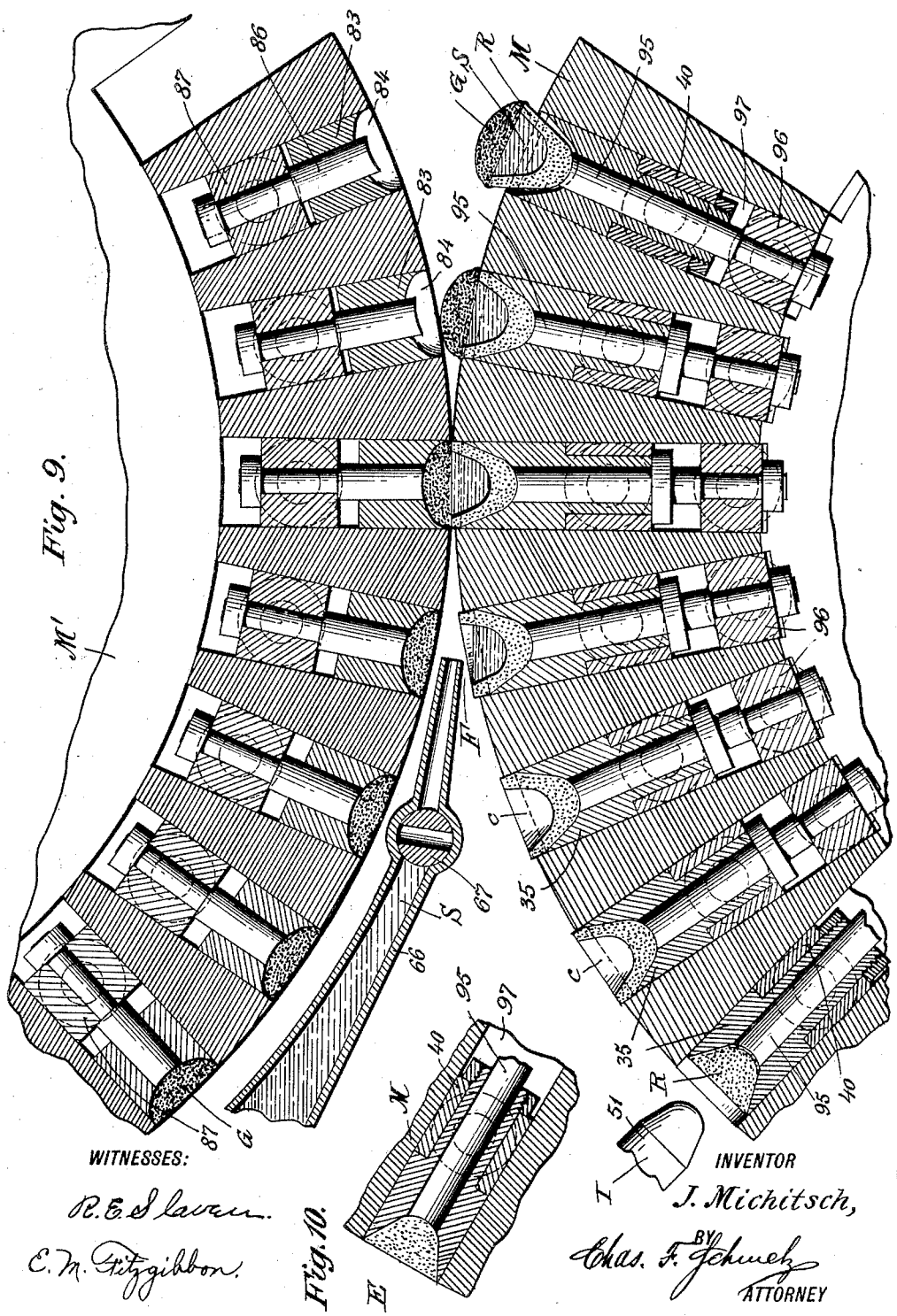

UNITED STATES PATENT OFFICE.

JOHN MICHITSCH, OF DETROIT, MICHIGAN.

CANDY-MACHINE.

1,108,461.  Specification of Letters Patent.  Patented Aug. 25, 1914.

Application filed July 12, 1913. Serial No. 779,952.

*To all whom it may concern:*

Be it known that I, JOHN MICHITSCH, a citizen of the United States, residing at Detroit, in the county of Wayne and State of Michigan, have invented certain new and useful Improvements in Candy-Machines, of which the following is a specification.

This invention relates to candy-making machines and has for its object a machine adapted to mold candy portions with hollow interiors, to fill the interior of some of the candy portions, to force the two portions of a candy berry together, and to deliver the completed berries where they may be gathered up.

Figures 11, 12:
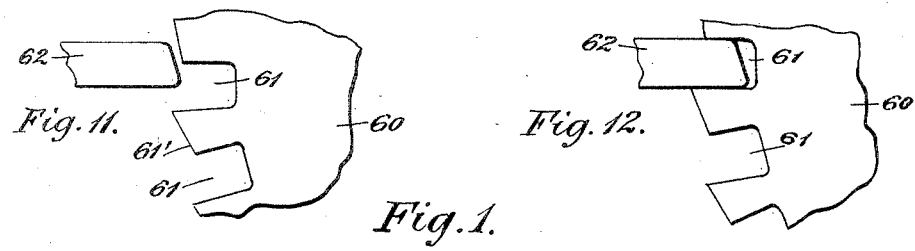
Figure 1:
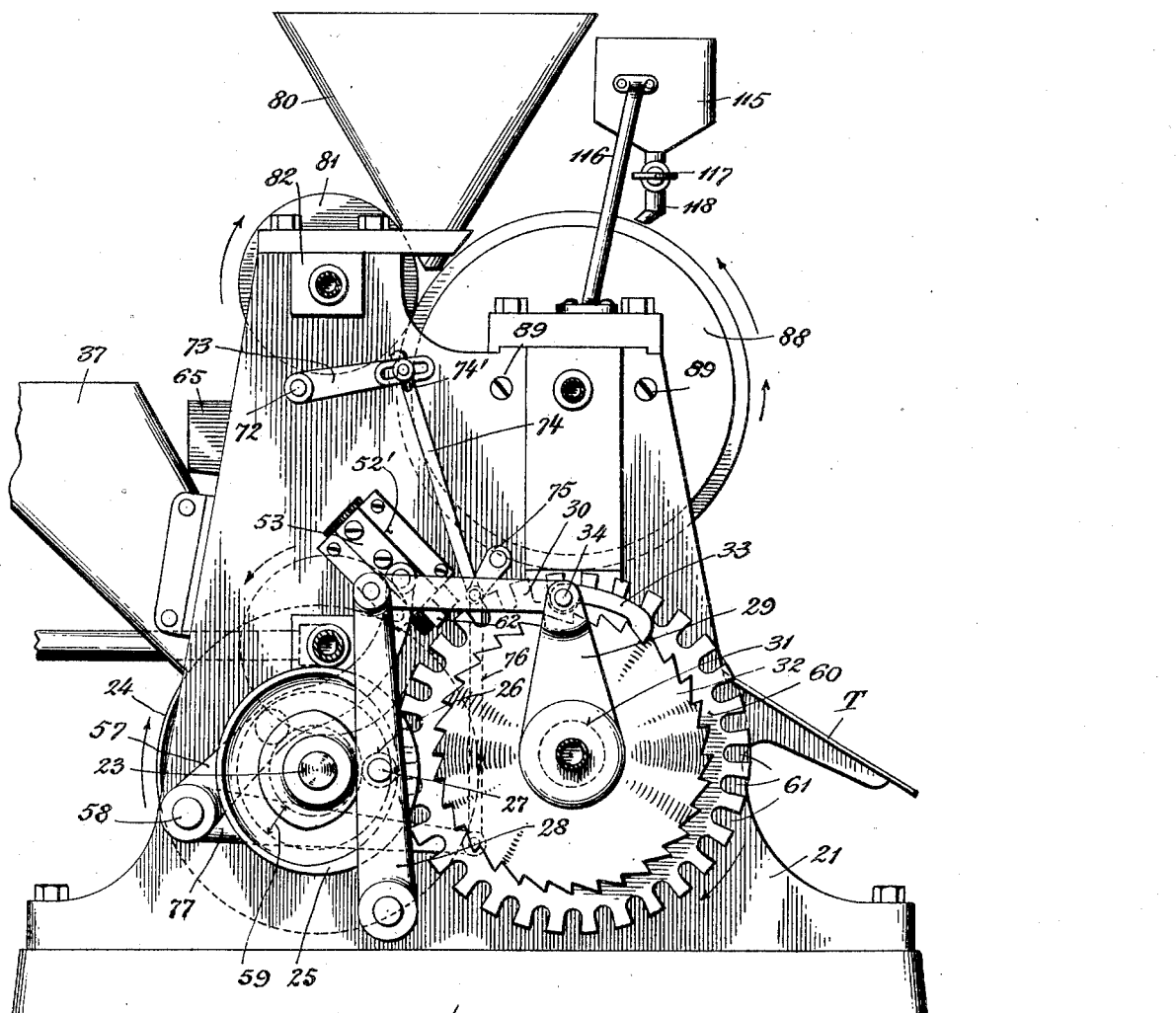
Figure 4:
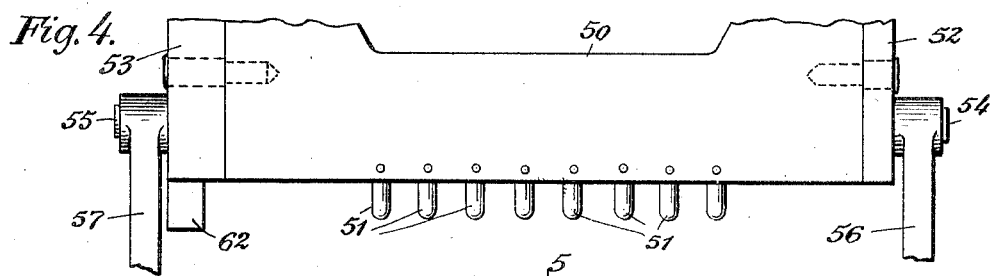
Figure 3:
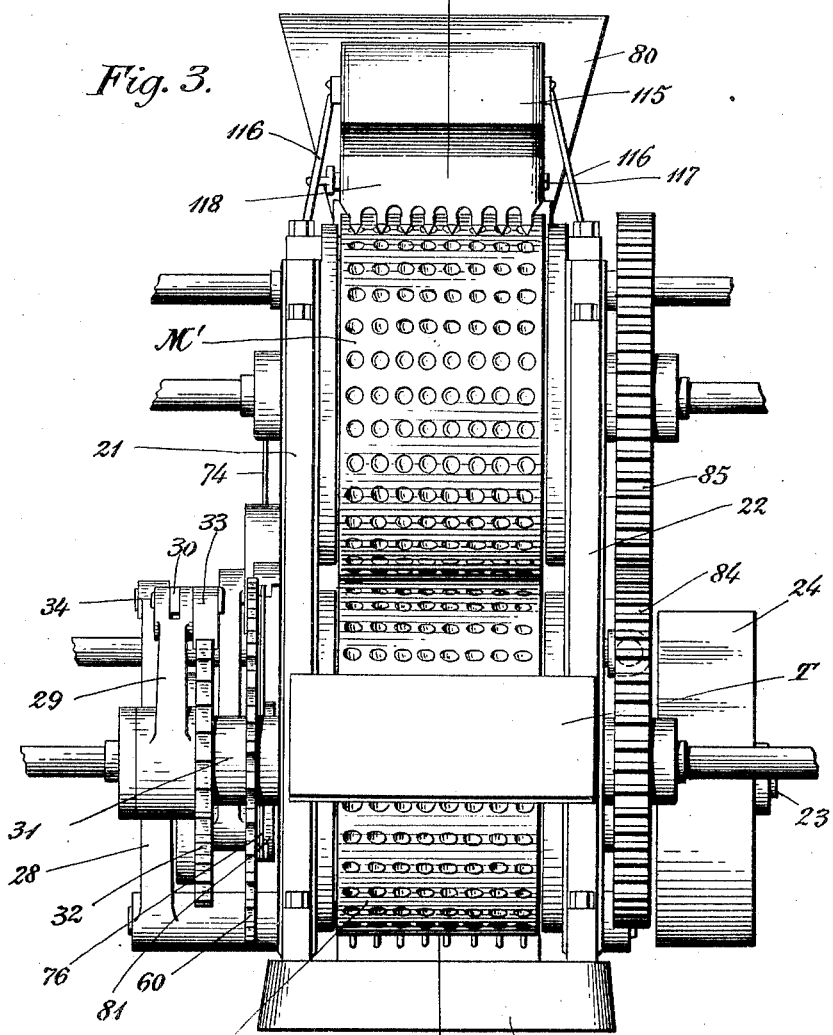

Figure 1 is a side view of the complete machine. Fig. 2 is a similar view, some of the parts shown in Fig. 1 having been omitted, and other parts having been broken away. Fig. 3 is an end view. Fig. 4 is an enlarged detail view of the indentor whereby the candy bodies are indented to fit them for the reception of the liquid filler. Fig. 5 is a central vertical section of the machine, substantially on line 5—5 of Fig. 3. Fig. 6 is an enlarged sectional detail showing a portion of the body mold and the ejectors carried thereby. Fig. 7 is a side elevation showing the side reverse of that shown in Fig. 1. Fig. 8 is an end view reverse of that shown in Fig. 3. Fig. 9 illustrates in enlarged sectional detail portions of the body and cap molds and illustrated in different positions the several steps through which the candy passes from the time that the caps and bodies have been supplied, to the finished stage of the product ready to be ejected from the body mold. Fig. 10 illustrates one of the steps in forming the candy body, preparatory to its being indented or cup-shaped. Fig. 11 (on Sheet 1) is a detail illustrating the manner in which the molds are locked against movement, the bolt being shown before it has reached the end of its movement. Fig. 12 is a view similar to Fig. 11 showing the locking bolt in place.

Referring to the drawings, 20 denotes a base plate to which are secured a pair of uprights or side frames 21—22 which are provided with suitable bearings in which a shaft 23 is journaled, this shaft constituting the principal driving member or cam shaft of the machine whereby all the several devices are controlled. Secured to the cam shaft is a pulley 24 to which power may be conveyed from any convenient source. Also secured to said shaft is a cam 25 having a groove in which travels a roller 26 which is journaled on a stud 27 held in a lever 28, the oscillatory movement of which serves to operate intermittently one of the candy molds, of which in the present instance two are employed for coöperation. Direct connection is made from the lever 28 to the lower one of said molds, through a crank arm 29 which is connected by a link 30 with the lever 28 above mentioned, the arm 29 however being loose upon a trunnion 31, which forms one of the journal members of the lower mold M which is journaled in suitable bearings provided therefor in the side frames 21 and 22. Rigidly secured to the trunnion 31 is a ratchet wheel 32 the teeth of which are successively engaged by a pawl 33 which is articulated on a stud 34 of the crank arm 29. From the above it will be understood that rotary motion of the cam shaft 23 will intermittently rotate the ratchet wheel 32, tooth by tooth, and thus rotate the candy molds M in proper coöperation.

The construction of the molds is in its generic features substantially the same, each consisting of a hollow cylinder the peripheral wall of which is provided with excavations or recesses which are shaped to correspond to the article of candy to be produced by the machine. In the present instance the mold rollers are adapted to produce a strawberry which is made in two parts viz:—the body portion and a cap for the same. The body portion is shaped in the lower mold M and is formed of red candy so as to conform with the natural color of the fruit to be imitated; while the cap is formed of green candy and shaped to resemble the stem portion of the berry. In order to provide a machine which is capable of producing these candy berries in large numbers, the lower mold has a large number of recesses or excavations which are disposed in longitudinally alined rows in the peripheral wall of said mold, the recesses of the successive rows being also in circumferential alinement with each other, the present body mold being provided with thirty-two longitudinal rows of eight recesses each, it being understood that the upper mold roller M' has its recesses disposed so as to correspond and coöperate with the recesses in the lower mold roller M.

Referring first to the lower mold roller M, its construction is clearly shown in Figs. 5, 6 and 9 in which the peripheral wall thereof is provided with a series of plugs 35 which are dug out to form cups shaped as indicated at 36 to correspond to the shape of the lower or body portion of the berry. Referring especially to Fig. 5, I have provided a reservoir or hopper 37 into which red candy paste R is placed in quantity, the latter being carried into engagement with the peripheral surface of the mold M by a feeding-in roll 38 which is illustrated as being frictionally driven from the surface of the roll M but may be geared thereto if desired, the main point to be emphasized being that of the mold roller M and feeding-in roller 36 being in close peripheral contact with each other. As the roller M is advanced by the ratchet-and-pawl mechanism above described, the paste is forced by the feeding-in roll 38 into the several recesses or excavations 36 at the feeding-in station E, as clearly shown in Fig. 5, each recess being completely filled with the paste so that in this instance the depth of the recess 36, taken together with the position of the plug 35 gages or controls the amount of paste of which the body portion of the berry is to be formed.

As the mold roller M is further advanced, the filled row of recesses will be brought into a position opposite to an indentor device whereby the paste in each filled recess will be indented so as to establish in each body a cavity which is subsequently filled with preferably a liquid filler as above mentioned. This means that the candy paste contained in each recess will be displaced in proportion to the depth with which the indentor enters the paste, and, in order to avoid the displaced paste's protruding beyond the mold roller M, I have provided means whereby the several plugs 35 are drawn radially inward thus increasing the length or depth of each pocket. Referring to Fig. 6 it will be noted that the several plugs 35 of each row are held in a bar 40 which extends through the heads m of the roller M and has at each of its ends a cam roller 41 traveling in a cam groove 42 provided in each of a pair of cams 43—44. Both of these cams are held against rotation by studs or screws 45 secured in the frames 21 and 22. The cam grooves 42 are therefore so constructed that when the filled pockets of the roller M travel from the entering or filling-in station E to the indenting station I, all the plugs will be slightly withdrawn, inwardly, whereupon the indentor becomes active in forming in each body paste a cavity c (see Fig. 9) which is subsequently to be filled with liquid filler at the station F.

The construction of the indentor mechanism is clearly shown in Figs. 5 and 4, and it consists of a bar 50 which is provided with a series of eight pins 51 having rounded ends as shown and of a diameter corresponding to the desired size of cavity c in the paste. The outer ends of the bar 50 are guided in ways 52' (see Fig. 1) provided for that purpose on the side frames 21, 22, respectively. The outer ends of the bar 50 carry pins 54—55 engaged by levers 56—57 which are rigidly secured on a cross shaft 58 journaled in the side frames 21, 22. Proper rocking movement is imparted to this shaft by a cam groove 59 provided in the rear face of the cam 25 (see Fig. 1).

Inasmuch as it is necessary that during the operation of the indentor the mold roller M should not only be at rest, but should as a matter of fact be positively locked in proper position and against further movement, I provide a locking mechanism comprising a disk 60 tightly secured upon the trunnion 31 of the lower mold roller M, this disk having a series of circumferential notches 61 corresponding in number to that of the ratchet teeth and adapted to be engaged by a lock-bolt 62 which is in the present instance formed on the bar 53 above mentioned in connection with the indentor bar 50. The operation of this lock-bolt 62 in conjunction with the notches 61 is clearly shown in Figs. 11 and 12 on Sheet 1 of the drawings where it will be noticed that the teeth of the disk 60 are cut away as shown at 61' so that the bolt 62 may project into the path of each tooth even before the notch 61 is in exact alinement with said bolt. From this it is evident that even if the momentum of the mold roller M should tend to carry the notch 61 beyond the lock-bolt 62, such action cannot take place, and the lock disk will therefore be held in position to bring the mold roller, or more particularly speaking its recesses, into exact position relatively to the indentor and also to the filling device which becomes operative in supplying liquid to the cavity c of the paste while said mold roller is at rest.

As above stated the filling station is indicated at F, and the filling mechanism comprises a tank 65 which contains syrup S properly flavored to correspond to the natural juice of the berry, or possessing any other desired quality. The tank is provided with a spout 66, the lower end of which terminates above the cavity to be filled, as clearly shown in Fig. 9, and it has a valve 67 consisting substantially of a plug which is also controlled by the cam shaft 23 so as to open and close at the proper time. Inasmuch as in some instances this syrup may be of a heavy nature rather than a thin liquid, I have provided in the reservoir 65 a pump comprising a cylinder 68 (see Fig. 5) in which a piston 69 is movable as controlled by an arm 70 having a link connection 71 with said piston. The arm 70 is secured to a shaft 72 which is journaled in the side frames 21—22 of the machine, and which carries at one end thereof a lever 73. This lever 73 is preferably connected by a link 74 with the operating arm 75 of the valve which is in turn connected by a link 76 with a cam lever 77 loosely fulcrumed on the shaft 58 above mentioned. By referring to Fig. 2 it will be noted that the cam lever 77 has a stud 78 on which is journaled a roller 79 which is operated by a groove 80 in a cam 81, the latter being tightly secured upon the shaft 23. From this description it will be understood that the cam lever 77 serves for operating both, the valve plug 67 as well as the piston 69, and in order to provide for the proper operation of these two members, so that the valve will be opened slightly in advance to the forced-out movement of the piston, the link 74 is slotted as at 74' thus allowing a slight upward movement of said link to permit the valve 67 to be opened before the lever 73 of the piston is moved to force the liquid past said valve. In a reversed manner, when the link 76 is pulled downward by the cam lever 77, the valve will first be closed before the piston 69 will be retracted to permit a fresh supply to enter the spout 66. In order to refill the spout the piston 69 is provided with a valve plug 69' which is normally closed by a spring as shown in Fig. 5, the valve yielding during the retracting stroke of the piston but seating itself during the feeding-stroke. After the cavity in the paste body has been filled substantially as shown in Fig. 9, the next intermittent movement of the mold roller M will bring the filled body into conjunction with the cap which, as has been above stated, is formed of green candy paste and is disposed in the corresponding recesses or excavations provided in the upper mold roll M'. Again referring to Fig. 5 the green candy mass is contained within a hopper 80 which is supported by the side frames of the machine and conducts the mass into contact with the upper mold roll M' which is coöperative with a feeding-in or loading roll 81 journaled in suitable bearings 82 in the side frames of the machine. The upper mold roll M' is substantially similar in construction to that of lower mold roll M, and has a series of plugs 83 which are recessed in their outer faces, as at 84, said recesses being shaped to correspond to the configuration of the cap or stem of the berry. The mold roll M' is driven directly from the lower mold roll M, the latter having a gear 84 (see Fig. 7) which meshes with a similar gear of the upper mold roll M'. The green candy paste is forced into recesses or excavations 84, at the loading station L (see Fig. 5), and the paste cap is then carried into the position to be sealed to the liquid-filled body at the meeting point between the two mold rolls M and M'. In the present instance the plugs 83 are stationary in the mold roll M', in contradistinction to those specified in connection with the mold roll M. At this meeting point the plugs of the lower mold roller are slightly pushed outward by the cam groove 43, thus raising the filled candy-body slightly beyond the peripheral surface of said mold roll and thus intimately unite the cap with the body so that no leakage can exist. As another intermittent movement is then imparted to both of the mold rolls, the sealed berry will be maintained in the lower roll M, and, in order to facilitate this action, I have provided in the upper mold roll an ejector mechanism with each row of recesses, this ejector becoming operative in forcing out the cap from their seat. The ejectors force the caps on to the bodies of the berries and complete the product. This ejector mechanism comprises for each plug 83 a plunger 86, all plungers being connected by a bar 87 to which a radial movement may be imparted relatively to the mold roll M' by a cam 88 which is stationary and thus held on the side frame 21, as for instance by screws 89. A similar cam is also provided at the opposite end of the mold roll M' and is held in the same manner. The respective cam grooves 90 of said cams control the movements of cam rollers 91 which are provided at both ends of the several bars 87. During the next succeeding intermittent movement of the mold rollers, the completed candies will be carried by the mold roll M to the discharge station indicated by D in Fig. 5, at which point the ejector mechanism carried by that roller becomes effective in pushing the candy berries from said roller onto a table T attached to the side frames of the machine.

The ejector mechanism connected with the mold roller M comprises for each pocket a plunger 95 the lower end of which is secured in a bar 96 whereby all the several plungers of one row are carried and which is guided for radial movement in slots 97 provided in the heads of said mold roller. Each end of the bar 96 carries a roller 98 traveling respectively in grooves 99 provided in the cams 43 above described.

Inasmuch as the candy paste which is applied to the mold rollers, is more or less sticky in nature, means are provided whereby each excavation has imparted thereto a film of palatable lubricant, such as for instance olive oil, so that the tendency of the paste adhering to the pockets, will be minimized.

In connection with the lower mold M I provide a tank 105 (see Fig. 5) having a cylinder 106 in which a piston 107 is movable to force the oil O through a series of spouts 108 and squirt the oil into the empty excavations of the lower mold roll M when the latter is stationary. The piston 107 moves, during its retrograde movement, back far enough to uncover an aperture 109 provided in cylinder wall so that then a certain quantity of the lubricant may enter the space in front of the piston. The latter is operated through a link 110 articulated to an arm 111 which is firmly secured to the shaft 58 so that consequently the movement of said piston is controlled by the cam shaft.

The recesses or pockets of the upper mold roll are lubricated by oil which gravitates from a receptacle 115 held on the side frames of the machine by braces 116. A valve 117 controls the passage of oil through the spout 118, one spout being provided for each recess of any row of the upper mold roller. In this instance the oil gravitates instead of being forced as described in connection with the previous case.

In order to prevent the paste from chilling while it is being manipulated into candy form, the several paste-handling devices are heated or warmed by steam or other fluid which may be introduced through pipes shown in the drawings.

Many changes may be made in the general organization as well as in the particular construction of some of the component elements of my improved machine, without departing from the spirit of my invention, especially as to the filler which may be of any suitable quality, either liquid, or semi-liquid, or even solid as stated in the preamble to this specification. If the candies are to be filled with a substance which is different than the paste of which the body and cap are formed, the indentation into the paste body may be either made by the device especially arranged for that purpose and as above described, or on the other hand in case of a nut or almond being used, the latter may make its own indentation as it is forced into place within the body. Furthermore the subjects which are to be handled by the machine may be of varied character without making any radical change in the machine except such as will be necessitated by having the recesses conformed to the shape desired.

I claim:—

1. The combination with a pair of coöperative molds, one a body mold and the other a cap mold, each having recesses, means for supplying paste, and means for forcing paste into said recesses, of means for advancing said molds, ejector devices each comprising a bar having pins projecting into said recesses, and means for moving said ejector devices to discharge the paste from said cap mold prior to the operation of the other ejector device for discharging the completed candy products from the body mold.

2. The combination with a pair of mold rollers, one a body mold the other a cap mold, each having recesses in its peripheral surface, means for connecting said rollers for movement together, and means for supplying paste, of means for forcing paste into said recesses, means for rotating said rollers, ejector devices for said rollers respectively, and means for moving the ejector device of the cap mold prior to the operation of the ejector device of the second roller, whereby the caps are first pressed upon the candy bodies and then the completed candies ejected.

3. The combination with a body mold roller, a cap mold roller, both rollers having recesses, of means for supplying paste, means for rotating said mold rollers, ejector devices for said mold rollers, and means for operating the ejector for the cap roller in advance of that of the body roller, whereby the caps are first pressed upon the candy bodies and then the completed candies ejected.

4. The combination with a body mold roller having a series of recesses arranged in rows of longitudinal and circumferential alinement, a cap roller having recesses adapted to register with those of the body mold roller, and means for supplying paste, of means for forcing paste into said recesses, means for operating said rollers simultaneously, ejector devices carried by said mold rollers, and means for operating the ejector device for the cap roller prior to the operation of the ejector device for the body roller, whereby the caps are first pressed upon the candy bodies and then the completed candies ejected.

5. The combination with a body mold roller, a cap mold roller coöperative therewith, both rollers having recesses adapted to register with one another, means for supplying paste to the recesses, means for forming cavities in the contents of the body mold recesses, of means for supplying filler, means for applying the filler to said cavities in the contents of the body mold recesses, independent ejector devices carried by said rollers, and means for advancing said rollers intermittently to present successive recesses to the filler supply.

6. The combination with a body mold roller, a cap mold roller coöperative therewith, both rollers having recesses adapted to register with one another, and means for supplying paste, of an indentor, means for operating the same, means for supplying filler, means for applying filler to the recesses made in the contents of the body mold recesses by the indentor, independent ejector devices carried by said rollers, and means for advancing said rollers intermittently to present successive recesses to the filler supply, the said registration of the two molds occurring after the supplying of paste to each mold, after the indenting of the contents of the one mold and after the filling of the indentations made in the contents of the one mold.

7. The combination with a body mold roller, a cap mold roller coöperative therewith, both rollers having recesses adapted to register with one another, and means for supplying paste, of an indentor, means for operating the same, means for supplying filler, means for applying filler to the recesses made in the contents of the body mold recesses by the indentor, independent ejector devices carried by said rollers, means for supplying lubricant to said rollers independently of each other preparatory to the insertion of paste into said recesses, and means for advancing said rollers intermittently to present successive recesses to the filler supply, the said registration of the two molds occurring after the supplying of paste to each mold, after the indenting of the contents of the one mold and after the filling of the indentations made in the contents of the one mold.

8. A candy-making machine, having in combination, a pair of mold rollers provided with a plurality of recesses, means for supplying and delivering paste to one roller, means for supplying and delivering a different paste to the other roller, means for forming a cavity in the molded portions of paste in one roller, means for delivering a filler into said cavity, and means for forcing the molded portions of paste in the other roller on to the corresponding molded and filled portions of the roller which carries the paste portions which have been provided with cavities.

9. A candy-making machine, having in combination, a roller provided with a plurality of recesses, means for supplying and delivering paste to the recesses, means for indenting the said paste portions forced into the recesses of the roller, and means for enlarging the recesses of the roller to compensate for the displacement of the indenting means.

10. A candy-making machine, having in combination, a roller provided with recesses, means for supplying and delivering paste to said recesses, indenting means for providing cavities in said portions of paste forced into recesses of the roller, and movable bottoms in said recesses for enlarging the recesses, compensating for the displacement brought about by the indenting means.

11. A candy-making machine, having in combination, a roller provided with recesses, a paste supply and delivering means, means for indenting the portions of the paste forced into the recesses of the roller, movable plug bottoms for the said recesses, and means for positively and timely moving said plugs to compensate for the displacement of the paste due to the indentations.

12. A candy-making machine, having in combination, a roller provided with recesses, radially movable plugs in the bottom of said recesses, radially movable ejectors slidable within the said radially movable plugs, means for supplying and delivering paste to the roller, indenting means for making cavities in the paste portions forced into the recesses of the roller, means for moving the radially movable plugs to compensate for the displacement caused by the indentation, means for automatically delivering a measured quantity of filler material into the indented paste portion, a second roller provided with corresponding recesses, means for delivering a supply of paste to the second roller, ejectors located on the second roller, means for operating the same to force the paste portions of the second roller on to the filler containing portions of the first roller, and means for ejecting the completed berries from the first roller.

13. A candy-making machine, having in combination, a body mold roller and a cap mold roller, means for supplying and delivering paste to each roller, means for forming cavities in the paste portions molded in the body roller, means for automatically supplying a measured quantity of filler material to the molded and cavitied bodies before the cap and body come together, the said rollers being arranged so that after filling the bodies and the caps come together to complete the berry.

14. A candy-making machine, having in combination, a roller provided with a plurality of molding recesses, means for supplying and delivering paste to the said recesses, a notched disk attached to said roller, and indenting and locking means, comprising a bar provided with a plurality of pins that enter the molding cavities and also a projection that drops into one of the notches of the disk to lock the roller during the indenting operation and center with respect to the pins the contents of the said recesses to be indented.

15. A candy-making machine, having in combination a pair of rollers provided with molding recesses, ejectors carried on each roller and in the molding recesses, means for supplying paste to the recesses of each roller, means for supplying filler material to the paste portions on one roller, and means for operating the ejector devices on one of the rollers prior to the operation of the ejector devices on the other roller, whereby the paste portions of the two rollers are forced together prior to the ejection of the completed berries.

In testimony whereof I affix my signature in presence of two witnesses.

JOHN MICHITSCH.

Witnesses:
 CHAS. F. SCHMELZ,
 R. B. LEWIS.